(12) United States Patent
Sharma et al.

(10) Patent No.: US 7,103,728 B2
(45) Date of Patent: Sep. 5, 2006

(54) SYSTEM AND METHOD FOR MEMORY MIGRATION IN DISTRIBUTED-MEMORY MULTI-PROCESSOR SYSTEMS

(75) Inventors: Debendra Das Sharma, Santa Clara, CA (US); Ashish Gupta, Cupertino, CA (US); William R. Bryg, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 388 days.

(21) Appl. No.: 10/201,180

(22) Filed: Jul. 23, 2002

(65) Prior Publication Data

US 2004/0019751 A1  Jan. 29, 2004

(51) Int. Cl.
*G06F 12/00* (2006.01)
(52) U.S. Cl. ............... 711/154; 711/141; 711/147; 711/148; 711/153; 711/156; 711/161; 711/162
(58) Field of Classification Search ............... 711/118, 711/119, 120, 130, 147–150, 154, 161–162, 711/141, 144, 145, 156, 165–166
See application file for complete search history.

(56) References Cited

U.S. PATENT DOCUMENTS

| 4,939,636 | A | * | 7/1990 | Nakagawa et al. ......... 711/147 |
| 5,146,605 | A | * | 9/1992 | Beukema et al. ............... 710/1 |
| 5,293,607 | A | | 3/1994 | Brockmann et al. |
| 5,530,837 | A | | 6/1996 | Williams et al. |
| 5,530,933 | A | | 6/1996 | Frink et al. |
| 5,727,150 | A | * | 3/1998 | Laudon et al. ............... 709/215 |
| 5,737,757 | A | * | 4/1998 | Hassoun et al. ............ 711/145 |
| 5,825,649 | A | * | 10/1998 | Yoshimura ................... 700/82 |
| 6,049,851 | A | | 4/2000 | Bryg et al. |
| 6,055,610 | A | * | 4/2000 | Smith et al. ................. 711/156 |
| 2002/0065998 | A1 | * | 5/2002 | Buckland ..................... 711/162 |

OTHER PUBLICATIONS

"An Overview of MPP Systems", Lucien Webpage, "http://lucien.blight.com/ ja-wells/311/report.html", 11 pgs.

* cited by examiner

Primary Examiner—Matthew Kim
Assistant Examiner—Zhuo H. Li (57) ABSTRACT

A distributed-memory multi-processor system includes a plurality of cells communicatively coupled to each other and collectively including a plurality of processors, caches, main memories, and cell controllers. Each of the cells includes at least one of the processors, at least one of the caches, one of the main memories, and one of the cell controllers. Each of the cells is configured to perform memory migration functions for migrating memory from a first one of the main memories to a second one of the main memories in a manner that is invisible to an operating system of the system.

19 Claims, 3 Drawing Sheets

SYSTEM AND METHOD FOR MEMORY MIGRATION IN DISTRIBUTED-MEMORY MULTI-PROCESSOR SYSTEMS

THE FIELD OF THE INVENTION

This invention relates generally to computer systems. This invention relates more particularly to memory migration in distributed-memory multi-processor systems.

BACKGROUND OF THE INVENTION

Historically, main memory was physically situated on a central bus. Within this type of system, memory requests consisting of full physical addresses were forwarded to the memory subsystem and the data was returned. In a distributed-memory system, main memory is physically distributed across many different cells. A cell may consist of a number of processors, one or more input/output (I/O) devices, a cell controller, and memory. Each cell holds a different portion of the main memory space. Each processor can access not only the local memory, but also the memories of other cells via cell communications link circuitry, such as one or more crossbar switches.

Caching can ameliorate the performance limitations associated with memory accesses. Caching involves storing a subset of the contents of main memory in a cache memory that is smaller and faster than main memory. Various strategies are used to increase the probability that cache contents anticipate requests for data. For example, since data near a requested word in memory address space is relatively likely to be requested near in time to the requested word, most caches fetch and store multi-word lines. The number of words stored in a single cache line defines the line size for a system. For example, a cache line might be eight words long.

Caches typically have far fewer line storage locations than main-memory. A "tag" is typically stored at each cache location along with data to indicate uniquely the main-memory line address owning the cached data.

In both single-processor and multi-processor systems, there is a challenge of ensuring "coherency" between the cache and main memory. For example, if a processor modifies data stored in a cache, the modification should be reflected in main memory. Typically, there is some latency between the time the data is modified in the cache and the time the modification is reflected in main memory. During this latency, the yet-to-be-modified data in main memory is invalid. Steps should be taken to ensure that the main memory data is not read while it is invalid.

In the case of a distributed-memory multi-processor system in which each processor or input/output module has a cache memory, the situation is somewhat more complex than for single processor systems having a cache memory. In a multi-processor system, the current data corresponding to a particular main memory address may be stored in one or more cache memories, and/or in a main memory. The data in a cache memory may have been operated on by a processor, resulting in a value that is different from the value stored in main memory. Thus, a "cache coherency scheme" is implemented to ensure that the current data value for any address is provided independent of where that data value resides.

Typically, "permission" is required to modify cached data. That permission is typically only granted if the data is stored in exactly one cache. Data stored in multiple caches is often treated as read only. Each cache line can include one or more state bits indicating whether permission is granted to modify data stored at that line. While the exact nature of the states is system dependent, there is typically a "privacy" state bit used to indicate permission to modify. If the privacy bit indicates "private," only one cache holds the data and the associated processor has permission to modify the data. If the privacy bit indicates "public", any number of caches can hold the data, but no processor can modify it.

In a multi-processor system, for a processor desiring to read or modify data, a determination is typically made regarding which caches, if any, have copies of the data and whether permission is given for modification of the data. "Snooping" involves examining the contents of multiple caches to make the determination. If the requested data is not found in the local cache, remote caches can be "snooped". Recalls can be issued to request that private data be made public so that another processor can read it, or recalls can be issued to invalidate public data in some caches so that another cache can modify it.

For large numbers of processors and caches, exhaustive snooping can impair performance. For this reason, some distributed-memory multi-processor systems snoop within cells and rely on directory-based cache coherency for inter-cell coherency. A distributed-memory multi-processor system with directory-based cache coherency is described in U.S. Pat. No. 6,055,610, filed on Aug. 25, 1997, issued on Apr. 25, 2000, and entitled "DISTRIBUTED MEMORY MULTIPROCESSOR COMPUTER SYSTEM WITH DIRECTORY BASED CACHE COHERENCY WITH AMBIGUOUS MAPPING OF CACHED DATA TO MAIN-MEMORY LOCATIONS", which is hereby incorporated herein by reference.

In a distributed-memory system employing directory-based cache coherency, the main memory of each cell typically associates a directory entry with each line of memory. Each directory entry typically identifies the cells caching the line and whether the line of data is public or private. The directory entries may also identify the particular cache(s) within a cell caching the data, and/or snooping may be used to determine which cache(s) within a cell has the data. Thus, each cell contains a directory indicating the location of cached copies of data stored in its main memory.

As an example, in an 8-cell system, each directory entry might be 9 bits long. For each of the eight cells, a respective "site" bit indicates whether or not that cell contains a cached copy of the line. The $9^{th}$, "privacy", bit indicates whether the data is held privately or publicly.

It is occasionally desirable to move or migrate memory from one cell to another, or within a particular cell. For example, memory may be migrated from a defective memory device to a spare memory device. As another example, a board containing one or more memory devices may need to be removed from the system, perhaps because the board contains a defective component, the board is being replaced by a newer revision, or for some other reason. Before removing the board, it may be desirable to migrate the memory from the board to another location.

Memory migration typically occurs with operating system intervention, with the memory first being deallocated, and then later reallocated to the desired destination. With such prior art memory migration techniques, processes accessing the memory being migrated might stall, or the system may have to wait for the processes to terminate before the memory can be migrated. Thus, prior art memory migration techniques affect the operation of the software, and occasionally cause the system to be unavailable for use for a period of time. In addition, certain pages that the operating system and firmware need cannot be easily migrated using prior art migration techniques.

Memory may also be interleaved, causing additional difficulties for memory migration using conventional techniques. De-interleaving memory is not a simple task, and sometimes a de-interleaving solution does not exist.

SUMMARY OF THE INVENTION

One form of the present invention provides a distributed-memory multi-processor system including a plurality of cells communicatively coupled to each other and collectively including a plurality of processors, caches, main memories, and cell controllers. Each of the cells includes at least one of the processors, at least one of the caches, one of the main memories, and one of the cell controllers. Each of the cells is configured to perform memory migration functions for migrating memory from a first one of the main memories to a second one of the main memories in a manner that is invisible to an operating system of the system.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
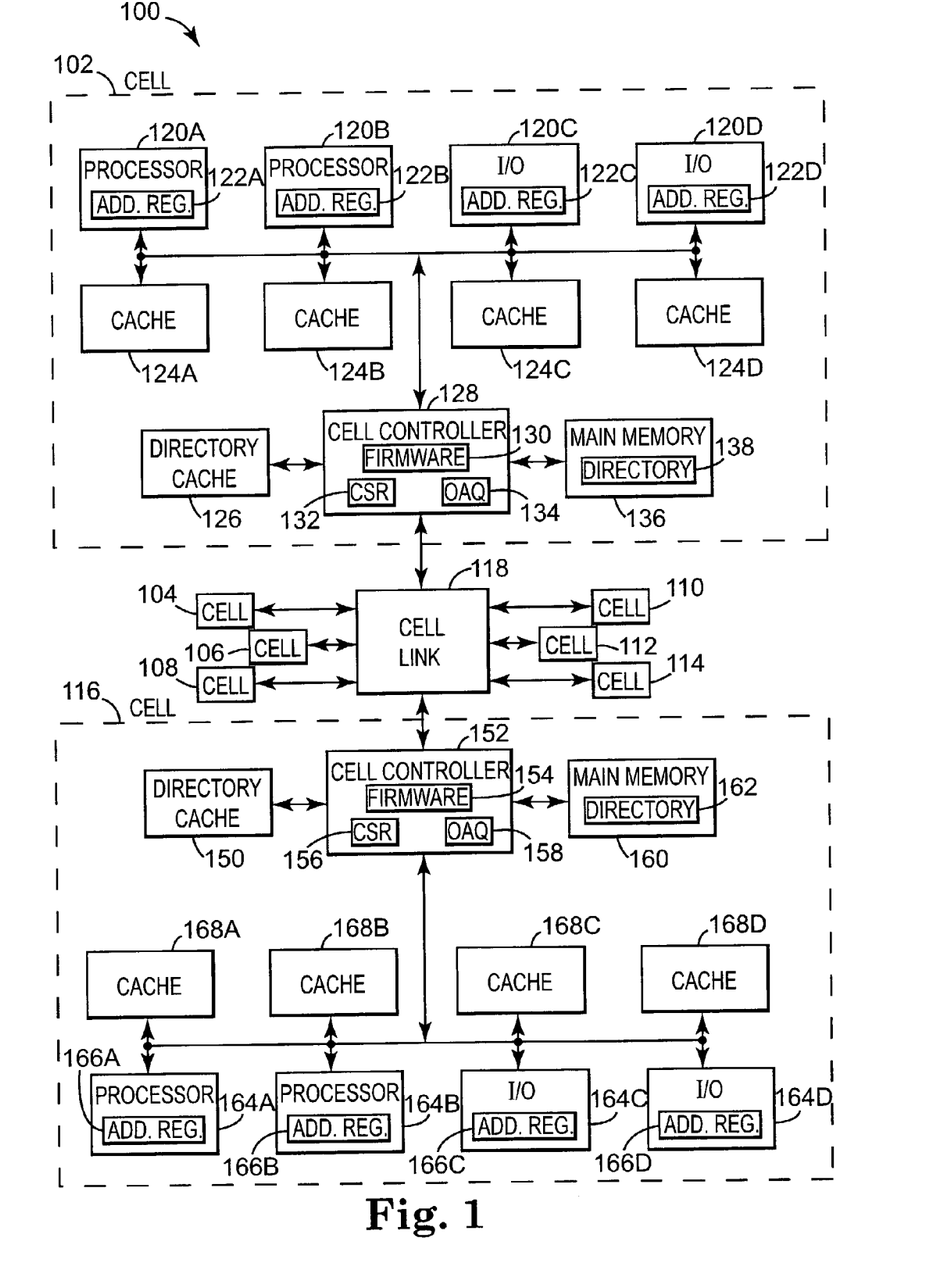
FIG. 1 is a block diagram illustrating a distributed-memory multi-processor system configured to migrate memory according to one embodiment of the present invention.

FIG. 1 is a block diagram illustrating a distributed-memory multi-processor system 100 configured to migrate memory without operating system intervention according to one embodiment of the present invention. System 100 includes eight cells 102, 104, 106, 108, 110, 112, 114, and 116, which are communicatively coupled via a cell communications link 118. Cell 102 includes four memory-accessing devices 120A–120D, four caches 124A–124D, a fast coherency directory or directory cache 126, a cell controller 128, and main memory 136. Likewise, cell 116 includes four memory-accessing devices 164A–164D, four caches 168A–168D, a fast coherency directory 150, a cell controller 152, and main memory 160.

In one embodiment, memory-accessing devices 120A–120B and 164A–164B are processors, and memory-accessing devices 120C–120D and 164C–164D are input/output (I/O) modules. Memory accessing devices 120A–120D include address registers 122A–122D, respectively. Memory accessing devices 164A–164D include address registers 166A–166D, respectively. Cell controller 128 includes firmware 130, configuration and status register (CSR) 132, and ordered access queue (OAQ) 134. Cell controller 152 includes firmware 154, configuration and status register 156 and ordered access queue 158. In one form of the invention, cells 104, 106, 108, 110, 112, and 114 are essentially the same as cells 102 and 116.

Although one embodiment of the present invention is described in the context of a multi-cell system, with each cell containing multiple processors and multiple I/O modules, it will be apparent to persons of ordinary skill in the art that the memory migration techniques described herein are also applicable to other system configurations. For example, rather than having cells like those shown in FIG. 1, an alternative embodiment of the invention may incorporate other system building blocks, such as single processor (with cache) building blocks, single 110 module (with cache) building blocks, or other building blocks.

In normal operation, according to one embodiment, system 100 is configured to access memory in a conventional manner using directory-based cache coherency. For example, when a word is fetched from main memory 136 by processor 120A, the word is stored in a cache line in cache 124A. In addition, words neighboring the requested word are also fetched and stored in the cache line along with the requested word.

A request for data by processor 120A includes a main-memory word address, which uniquely identifies one of the main-memory locations in system 100. Cache 124A converts the main-memory word address from processor 120A into a line address by removing a number of the least-significant bits of the main-memory address. This line address is forwarded to cell controller 128 to locate the requested data. If the request must be forwarded to an owner cell, cell controller 128 decodes a number of the most significant bits of the line address into a cell ID, and forwards the remaining bits of the address to the appropriate cell so that the request can be met. In one embodiment, the cell controllers handle all memory transactions within and between cells.

The caches (e.g., caches 124A–124D and 168A–168D) use a number of the bits of the line address to identify a cache line. The remaining bits of the line address are then compared to a tag stored at the identified cache line. In the event of a "hit" (i.e., the tag matches the remaining bits of the line address), a number of the least significant bits of the line address are used to select one of the words stored in the identified cache line for forwarding to the processor (or I/O module). In the event of a "miss" (i.e., the tag does not match), the line eventually fetched from main memory overwrites the line of data at the identified cache line, and the tag at the identified cache line is updated. Finally, the requested word is forwarded from the cache line to the processor (or I/O module).

In one form of the invention, coherency is implemented in a conventional manner in system 100 by including state bits with each cache line in the caches (e.g., caches 124A–124D and 168A–168D), storing coherency information in a coherency directory (e.g., coherency directories 138 and 162) in the main memory of each cell, and storing coherency information in a fast coherency directory (e.g., fast coherency directories 126 and 150) of each cell.

In one embodiment, in addition to storing tag bits and user data bits at each cache line, a "validity" state bit and a "privacy" state bit are also stored at each cache line. The validity state bit indicates whether the cache line is valid or invalid. The privacy state bit indicates whether the data stored at the cache line is public or private. A processor can read any valid data in its cache. However, in one embodiment, the processor can only modify data that its cache holds privately. If a processor needs to modify data that it holds publicly, the data is made private first. If a processor needs to modify data that is not in its associated cache, the data is entered into its cache as private. If the data is in use by another cache, the data is recalled from that cache before it is made private.

In one embodiment, snooping is used to locate copies of requested data in caches associated with other processors (or I/O modules) in the same cell. Thus, if processor 120A requests to modify data that it holds publicly, cell controller 128 uses snooping to effect a recall of any copies in local caches 124A–124D. The recall serves to request that any privately held copy be converted to public as soon as possible and that public copies be invalidated. Once there are no outstanding copies of the data, a private copy of the data can be provided to processor 120A or its public copy can be made private. Processor 120A can then modify its private copy of the data.

In one embodiment, inter-cell coherency is directory-based in system 100. If a request cannot be satisfied intra-cell, it is forwarded to the cell controller for the cell owning the requested data. For example, if processor 120A asserts an address within main memory 160, then cell 116 owns the requested data. Cell controller 152 is charged with finding copies of the requested data system wide. Information required for this search is maintained in a coherency directory 162 that is stored on a line-by-line basis with user data in main-memory 160. In one form of the invention, each line of main memory stores site bits and state bits. In one embodiment, the site bits indicate for each cell whether the cell holds a copy of the line, and snooping is used to identify particular caches within the cell holding a copy of the line. In an alternative embodiment, the site bits indicate for each cache in each cell whether the cache holds a copy of the line. In one form of the invention, the main directory state bits include a "privacy" state bit and a "sharing" state bit. The privacy main-directory state bit indicates whether the data is held publicly or privately. The sharing main-directory state bit indicates whether the data is "idle" or cached by multiple caches. If the sharing state bit indicates that the data is idle, the data is either not cached, or it is cached by only a single cache.

From the state bits in coherency directory 162, cell controller 152 can determine which cells in system 100 hold copies of the requested data and whether the data is held privately or publicly. Recalls can be directed to the identified cells accordingly.

Fast directory 150 permits predictive recalls to be initiated. In one embodiment, fast directory 150 does not store user data information, but stores a subset of the coherency directory information stored in the main directory 162 of main memory 160. Techniques for implementing a fast directory and initiating predictive recalls are known to those of ordinary skill in the art.

In one form of the invention, in addition to storing coherency information, the coherency directories in the main memories in system 100 (e.g., directories 138 and 162) also store migration status information, which is used to identify the migration state of lines during a memory migration transaction. In one embodiment, the migration status information identifies one of four migration states: (1) Home_Cell_Ownership; (2) Waiting_For_Migration; (3) In_Migration; or (4) Migrated. Each of these migration states is discussed in further detail below with reference to FIGS. 2 and 3A–3C. Each cell controller (e.g. cell controller 128 for cell 102, and cell controller 152 for cell 116) includes firmware (e.g., firmware 130 for cell controller 128, and firmware 154 for cell controller 152) for causing the cell controllers to perform memory migration functions as described herein.

In one embodiment, memory migration is done on a cache line by cache line basis. In alternative embodiments, memory sizes other than a single line may be used. The term "new cell" is used to identify the cell to which the line will be migrated to, and the term "old cell" is used to identify the cell where the line will be migrated from. In one embodiment, the migration can occur within the same cell, where a line is moved from one physical location in memory within the cell to another physical location in memory within the same cell.

Figure 2:
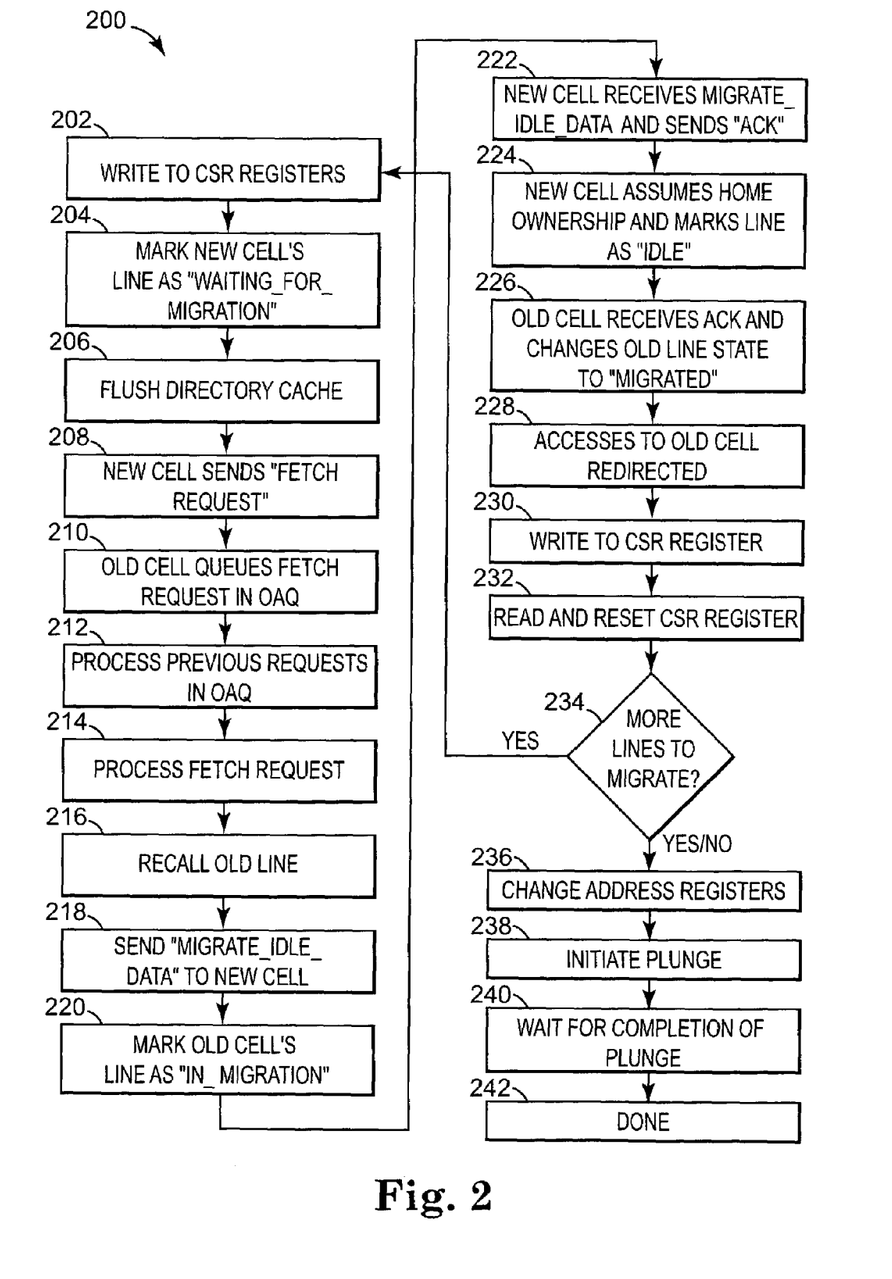
FIG. 2 is a flow diagram illustrating a memory migration process according to one embodiment of the present invention.

FIG. 2 is a flow diagram illustrating a memory migration process 200 according to one embodiment of the present invention. For memory migration process 200, it will be assumed that memory is being migrated from cell 102 to cell 116, so cell 102 is referred to as the "old cell" and cell 116 is referred to as the "new cell." In step 202, firmware 130 in cell controller 128 initiates the migration by causing a bit to be written in configuration and status register 132 in the old cell 102, followed by writing to a bit in configuration and status register 156 in the new cell 116. The write to the configuration and status register 132 in old cell 102 informs the cell that memory is being migrated from that cell, and the write to the configuration and status register 156 in new cell 116 informs the cell that memory is being migrated to that cell. At this point, the processor and I/O module address range registers (e.g., registers 122A–122D in old cell 102, and registers 166A–166D in new cell 116) still point to the old cell 102 as the owner of the line to be migrated.

In step 204, cell controller 152 sets the migration state in directory 162 for a selected one of the memory lines (i.e., "new line") in main memory 160 to "Waiting_For_Migration." In step 206, any references to the new line in fast directory 150 are flushed. In one embodiment, any requests to the new line in the "Waiting_For_Migration" state are illegal and appropriate error recovery/logging steps are initiated.

In step 208, cell controller 152 in new cell 116 sends a "fetch request" with change of ownership intent for the desired line (i.e., "old line") to the old cell 102. The fetch request indicates to the old cell 102 that the new cell 116 is requesting to become the home cell for the line. In an alternative embodiment, the fetch request could be initiated by an entity other than the new cell 116.

In step 210, cell controller 128 queues the fetch request in its ordered access queue 134. In step 212, any earlier requests to the old line are processed in the normal manner by cell controller 128. When the turn of the fetch request arrives, in step 214, cell controller 128 processes the fetch request. In step 216, cell controller 128 recalls the old line from any entity (e.g., processor or I/O module) owning it.

In step 218, cell controller 128 returns a response to the fetch request, transferring the old line data with home cell ownership through a "Migrate_Idle_Data" transaction. In step 220, cell controller 128 sets the migration state in directory 138 for the old line to "In_Migration." Any request to the old line at this point is either queued in the ordered access queue 134 (space permitting), or is "nack'ed" (i.e., not acknowledged). In one embodiment, the old cell 102 does not process any requests for the old line while it is in the "In_Migration" state.

In step 222, cell controller 152 receives the "Migrate_Idle_Data" transaction, and sends an "Ack" (i.e., acknowledgement) transaction. In step 224, cell controller 152 copies the received line data to the new line, assumes home ownership of the line and marks the line as "idle" in directory 162. The line is marked as "idle" since no other entity has this line. As described above, the line was recalled from any previous holders in step 216.

In step 226, cell controller 128 receives the "Ack" transaction from cell controller 152, and transitions the migration state in directory 138 for the old line to the "Migrated" state. In step 228, any access pending in ordered access queue 134 for the old line or any new access for the old line is now redirected by cell controller 128 to the new home cell 116 for the line. In an alternative embodiment, cell controller 128 responds to the requestors for the old line, requesting them to send their requests to the new cell 116. In step 230, when the old cell 102 does not have any more pending entries in the ordered access queue 134 for the old line, cell controller 128 sets a status bit in its configuration and status register 132 to indicate that all of the pending requests for the old line have been taken care of. At this point, in one embodiment, no new requests for the old line are queued in ordered access queue 134. All new requests for the old line are forwarded by cell controller 128 to the new cell 116.

In step 232, firmware 130 reads configuration and status register 132, and sees that the status bit has been set (in step 230). Firmware 130 then resets the status bit. In step 234, firmware 130 determines whether additional lines are to be migrated from the old cell 102. If additional lines are to be migrated, steps 202–232 are repeated for each such line. Regardless of whether additional lines are to be migrated, steps 236–240 are performed to complete the migration of the first line.

In step 236, firmware 130 changes the address range registers (e.g., address range registers 122A–122D and 166A–166D) in all memory-accessing devices (e.g., processors or I/O modules) to ensure that all new requests for the old line go to the new cell 116. The change of the address registers does not happen instantaneously. During the change, if any requests for the old line are sent to the old cell 102, these requests are forwarded by the old cell 102 to the new cell 116. In an alternative embodiment, the old cell 102 bounces such requests back to the requester, informing the requester to send the request to the new cell 116. After the change in step 236, the address range registers for all of the memory-accessing devices point to the new cell 116 as the home cell for the line that was migrated. In one embodiment, the address range registers may be implemented in the form of a cell map.

In step 238, since there may still be some outstanding requests for the old line (e.g., requests pending in an ordered access queue that have not yet been processed), firmware 130 initiates a "plunge" from all possible requesters to the old cell 102 to ensure that any prior requests to the old cell 102 have reached the old cell 102 (and have been redirected to the new cell 116). A plunge transaction is sent from all possible memory-accessing devices to the old cell 102. Since the plunge transactions are queued like any other memory request transaction, by the time the old cell 102 receives all of the plunge transactions, firmware 130 knows that all requests for the old line have been received (and have been redirected to the new cell 116).

In step 240, firmware 130 waits for the configuration and status register 132 to indicate that the plunge is complete, which indicates to firmware 130 that there are no more outstanding requests for the old line. In an alternative embodiment, rather than using a plunge transaction, firmware 130 waits for a predetermined period of time that is long enough for all outstanding requests to the old line to have reached the old cell 102 and been redirected to the new cell 116.

As indicated by step 242, after the plunge transaction has been completed (or after the predetermined period of time has elapsed), the migration of the line is now complete.

Figure 3A:
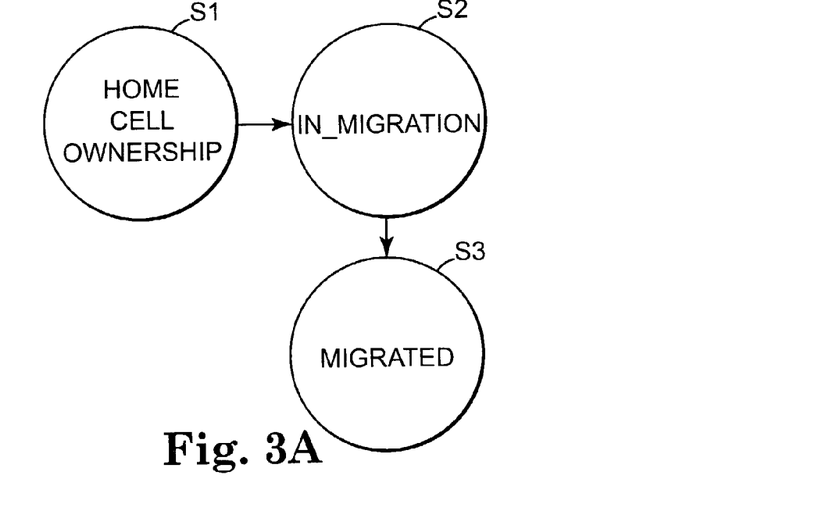
FIG. 3A is a state diagram illustrating directory state transitions for an "old cell" during a memory migration sequence according to one embodiment of the present invention.

FIG. 3A is a state diagram illustrating directory state transitions in directory 138 for a memory line to be migrated from old cell 102 during a memory migration process 200 according to one embodiment of the present invention. As indicated by state S1 in FIG. 3A, the starting migration state in directory 138 for the old line in old cell 102 is "Home_Cell_Ownership," indicating that old cell 102 is the current home cell for the line to be migrated. The second migration state S2 for the old line is "In_Migration." As described above, the migration state of the old line is transitioned from "Home_Cell_Ownership" to "In_Migration" during step 220 of process 200. The third migration state S3 for the old line is "Migrated." The migration state of the old line is transitioned from "In_Migration" to "Migrated" during step 226 of process 200.

Figure 3B:
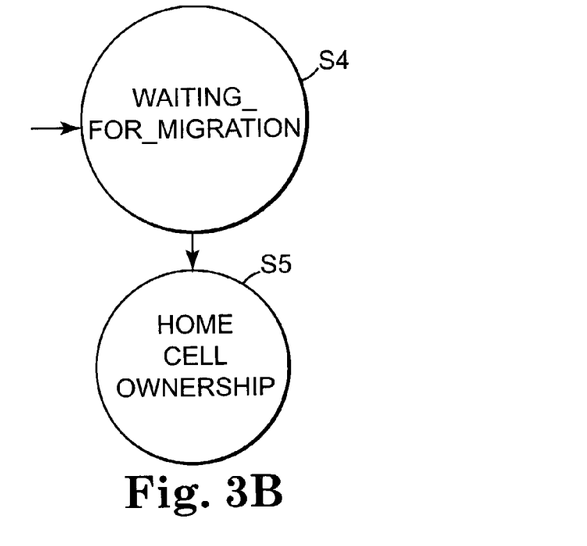
FIG. 3B is a state diagram illustrating directory state transitions for a "new cell" during a memory migration sequence according to one embodiment of the present invention.

FIG. 3B is a state diagram illustrating directory state transitions in directory 162 for a memory line in new cell 116 during a memory migration process 200 according to one embodiment of the present invention. As indicated by state S4 in FIG. 3B, the migration state in directory 162 for the new line in new cell 116 is "Waiting_For_Migration," which is set during step 204 of process 200. The next migration state S5 for the new line is "Home_Cell_Ownership," indicating that cell 116 is the new home cell for the migrated line. The migration state of the new line is transitioned from "Waiting_For_Migration" to "Home_Cell_Ownership" during step 224 of process 200.

Figure 3C:
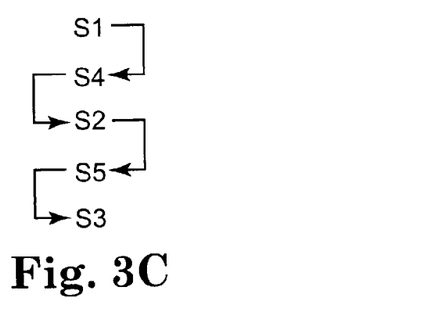
FIG. 3C is a diagram illustrating the time order of the states shown in FIGS. 3A and 3B.

FIG. 3C is a diagram illustrating the time order of the states shown in FIGS. 3A and 3B. As shown in FIG. 3C, the memory migration process 200 begins with the old line in old cell 102 in state S1 (Home_Cell_Ownership). Next, during the memory migration process 200, the migration state of the new line in the new cell 116 is set to state S4 (Waiting_For_Migration). Later during the migration process 200, the migration state of the old line in the old cell 102 is transitioned to state S2 (In_Migration). Next, the migration state of the new line in the new cell 116 is transitioned to state S5 (Home_Cell_Ownership). Lastly, the migration state of the old line in the old cell 102 is transitioned to state S3 (Migrated).

In one embodiment, one or more address ranges of memory are migrated during a migration sequence, although the granularity of migration is one memory line. The multiple memory lines in the desired address range(s) may be in a variety of different migration states at any given time. In one form of the invention, the address range registers are not updated (e.g., step 236 in FIG. 2) to reflect the migration until all memory lines in the specified range have been migrated.

Embodiments of the present invention provide numerous advantages over prior memory migration techniques. One form of the present invention provides a system and method for dynamically migrating memory, whether interleaved or not, from one location to another without requiring involvement of the operating system in distributed-memory multi-processor system with directory-based cache coherency. In one embodiment, the migration uses hardware with some software help, which is provided either by system firmware or utilities firmware. In one form of the invention, software accessing the migrated memory can continue to access memory seamlessly while migration is occurring, so there is no interruption of service to the user. In one form of the invention, the migration occurs without the involvement of, or adverse effects on, the operating system and application software. In one embodiment, the migration is "invisible" to the operating system, and the operating system and the application software do not need to be informed that the migration is occurring or has occurred.

One form of the invention provides a memory migration process that is independent of the processor interfaces and does not require the processor interface protocols to support any new transactions to implement the migration functionality. Any processor or I/O controller design can be used with one embodiment of the memory migration process.

In one embodiment, the techniques described herein can be used to migrate memory when additional memory is added to a system, and can be used with conventional error detection and correction schemes to migrate defective memory locations to spare memory locations. If the defective memory is replaced or otherwise repaired, the spare memory locations can be migrated back to the new or repaired memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A distributed-memory multi-processor system comprising:
   a plurality of cells communicatively coupled to each other and collectively including a plurality of processors, caches, main memories, and cell controllers;
   each of the cells including at least one of the processors, at least one of the caches, one of the main memories, and one of the cell controllers;
   wherein each of the cells is configured to perform memory migration functions for migrating memory from a first one of the main memories to a second one of the main memories without intervention by an operating system of the multi-processor system; and
   wherein the system is configured to automatically update address registers of the processors in response to completion of the migration, thereby causing new requests for the migrated memory to be directed to the second one of the main memories rather than the first one of the main memories.

2. The distributed-memory multi-processor system of claim 1, wherein at least one of the cells further includes at least one input/output module with an associated cache.

3. The distributed-memory multi-processor system of claim 1, wherein the system is configured to migrate memory from a first location in a main memory to a second location in the same main memory without intervention by the operating system of the multi-processor system.

4. The distributed-memory multi-processor system of claim 1, wherein the system is configured to allow the memory being migrated to be accessed during migration of the memory.

5. The distributed-memory multi-processor system of claim 1, wherein the system is configured to perform the migration of memory on a memory line by memory line basis.

6. The distributed-memory multi-processor system of claim 1, wherein each cell includes a cache coherency directory, and wherein the cache coherency directories are configured to store migration status information.

7. The distributed-memory multi-processor system of claim 6, wherein the migration status information indicates a migration state of a memory line during the migration.

8. The distributed-memory multi-processor system of claim 7, wherein the migration status information indicates at least three migration states, including a first state indicating that a memory line is waiting for migration, a second state indicating that a memory line is in migration, and a third state indicating that a memory line has been migrated.

9. The distributed-memory multi-processor system of claim 1, wherein each cell includes firmware for performing memory migration functions.

10. A method of migrating memory in a distributed-memory multi-processor system, the method comprising:
    providing a plurality of cells, each cell including at least one processor, at least one cache, a main memory, a cell controller, and a cache coherency directory;
    initiating a memory migration transaction between a first one of the cells and a second one of the cells;
    copying data from a first memory portion in the main memory of the first cell to a second memory portion in the main memory of the second cell during the memory migration transaction; and
    storing migration status information in the cache coherency directories of the first and the second cells, the migration status information indicating migration states of the first and the second memory portions during the memory migration transaction.

11. The method of claim 10, wherein the first and the second cells each include a configuration and status register, the method further comprising:
    writing to the configuration and status registers of the first and the second cells to inform the first cell that memory is being migrated from the first cell and to inform the second cell that memory is being migrated to the second cell.

12. The method of claim 10, and further comprising:
    sending a fetch request from the second cell to the first cell requesting migration of the first memory portion in the first cell to the second memory portion in the second cell.

13. The method of claim 10, and further comprising:
    sending a recall request to caches holding a copy of the first memory portion.

14. The method of claim 10, and further comprising:
    redirecting memory accesses originally directed to the first memory portion to the second memory portion after the data has been copied from the first memory portion to the second memory portion.

15. The method of claim 10, wherein each processor includes an address register, the method further comprising:
    updating the address registers of the processors based on the memory migration transaction.

16. The method of claim 10, wherein the migration status information indicates at least three migration states, including a first state indicating that a memory portion is waiting for migration, a second state indicating that a memory portion is in migration, and a third state indicating that a memory portion has been migrated.

17. The method of claim 10, wherein the memory migration transaction is performed without operating system intervention.

18. A distributed-memory multi-processor system with directory-based cache coherency comprising:
   a plurality of cells, each cell including at least one processor, at least one cache, a main memory, a cell controller, and a cache coherency directory;
   each cell configured to perform memory migration functions for migrating a memory portion from the main memory of one cell to the main memory of another cell; and
   each cache coherency directory configured to store migration status information representing a migration state of memory portions in the main memory of the cell containing the cache coherency directory.

19. The distributed-memory multi-processor system of claim 18, wherein each cell controller includes firmware for performing the memory migration functions.

* * * * *

UNITED STATES PATENT AND TRADEMARK OFFICE
CERTIFICATE OF CORRECTION

PATENT NO. : 7,103,728 B2 Page 1 of 1
APPLICATION NO. : 10/201180
DATED : September 5, 2006
INVENTOR(S) : Debendra Das Sharma et al.

It is certified that error appears in the above-identified patent and that said Letters Patent is hereby corrected as shown below:

On the Title Page, Item (75), in "Inventors", line 2, delete "Cupertino," and insert -- San Jose, --, therefor.

In column 4, line 23, after "single" delete "110" and insert -- I/O --, therefor.

Signed and Sealed this

Twelfth Day of January, 2010

David J. Kappos
*Director of the United States Patent and Trademark Office*